May 25, 1965     KIYOSHI MIYAGAWA ETAL     3,185,987

OSCILLATION CONTROL DEVICE FOR USE IN RECORDING INSTRUMENTS

Filed July 11, 1961

*INVENTORS*
Kiyoshi Miyagawa &
BY Yasohachi Katagiri

ATTORNEYS

United States Patent Office 3,185,987
Patented May 25, 1965

3,185,987
OSCILLATION CONTROL DEVICE FOR USE IN RECORDING INSTRUMENTS
Kiyoshi Miyagawa and Yasohachi Katagiri, both of Tokyo, Japan, assignors to Nippon Electric Company, Limited, Tokyo, Japan
Filed July 11, 1961, Ser. No. 123,183
Claims priority, application Japan July 13, 1960, 35/31,638
10 Claims. (Cl. 346—65)

This invention relates to recording equipment and more particularly to recording equipment having novel means for receiving input signals.

Heretofore a great deal of difficulty has been experienced in adjusting the recording ranges of recording equipment of the type employed in depth measurement or fish detection apparatus using echo devices. Such devices of the prior art in order to change recording ranges employed a plurality of oscillation selection brushes which are arranged at positions to cooperatively associate with an oscillation control brush. This is performed by providing a complicated slip ring in an electric circuit comprising the oscillation selection brushes in combination with a changeover switch for adjusting the point of oscillation.

The device of our invention provides an arrangement which permits relatively simple manual adjustment while at the same time providing a substantially smaller recording instrument.

Our invention is comprised of a recording pen and an oscillation selection cam which are mounted for rotation under control of a rotary driving means. A plurality of oscillation selection brushes positioned around the cam means cooperate with the cam conductive segment for providing an indication that the selected oscillation signal has been connected. The control brushes are mounted to a rotatable insulating means which is so designed as to permit relatively simple positioning of the control brushes with respect to the cam means conductive segment. Sliding contact members cooperate with the oscillation control brushes to provide continuous electrical contact therewith.

It is therefore one object of our invention to provide a recording instrument wherein novel means are provided to connect one oscillation signal into the circuit.

Another object of our invention is to provide a recording instrument having novel means for selecting the desired oscillation frequency in accordance with the desired measuring ranges being recorded.

Still another object of our invention is to provide a recording instrument having novel means for maintaining continuous electrical contact with the oscillation signal input brushes regardless of the positioning of said brushes.

The foregoing and other objects of the invention will be best understood from the following description of exemplifications thereof, reference being made to the accompanying drawings, wherein.

Figure 1:
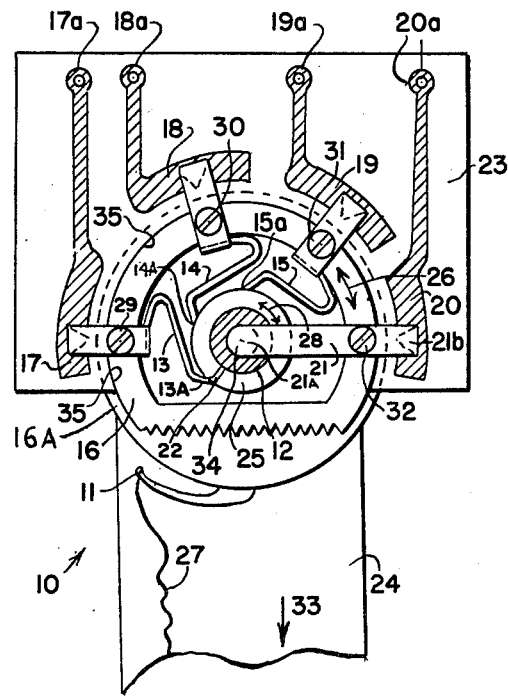
FIG. 1 is a top plan view of our novel recording instrument.
Figure 2:
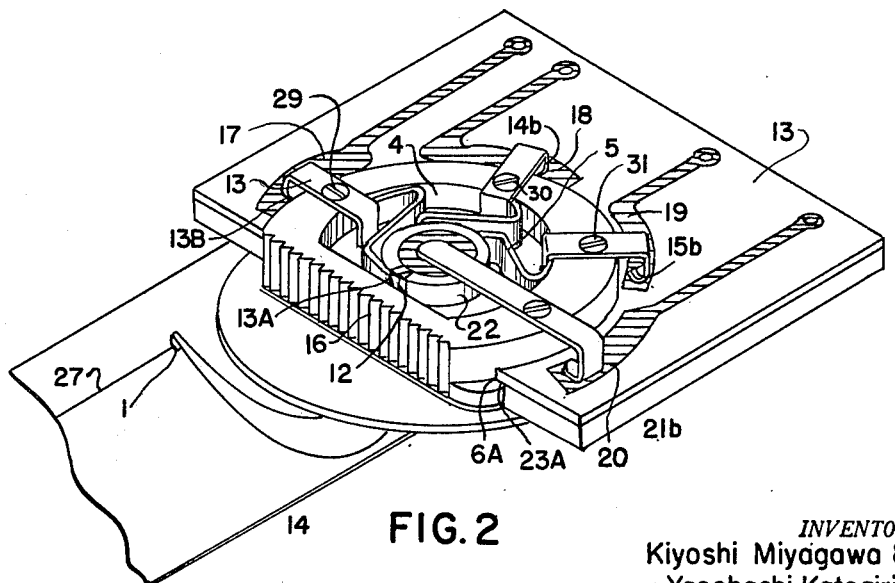
FIG. 2 is a perspective view of our novel recording instrument shown in FIG. 1.

Referring now to the drawings, FIG. 1 shows a recording instrument 10 which is comprised of a recording paper tape 24 which is driven in the direction shown by arrow 33 in any well known manner. A recording pen 11 is mounted immediately above paper tape 24 in order to produce a trace on the paper tape such as the trace 27. Recording pen 11 is constantly rotated and is moved in a direction substantially transverse to the movement of paper tape 24 by means of a shaft 34 which is operated by the receiving equipment (not shown) which drives the shaft 34 in any well known manner. An oscillation signal selection cam 25 is also secured to shaft 34 so as to be rotated upon the rotation of shaft 34. The top surface of oscillation signal selection cam 25 is provided with a disc shaped slip ring 12 which is in continuous electrical contact with conductive segment 22 of oscillation control cam 25. The remaining outer periphery of oscillation control cam 25 is formed of an insulating material.

A base portion 23 of insulating material is positioned with respect to shaft 34 and paper tape 24 so that its arcuate notch 35 has its center point concentric with the longitudinal axis of shaft 34. An annular ring 16 of insulating material is mounted in arcuate slot 35 and is supported therein by means of a ledge 16A along the outer periphery of annular member 16 which cooperates with a complementing ledge 23A along the periphery of notch 35 in a manner to be more fully described.

A plurality of oscillation signal input brushes 13, 14 and 15 are mounted to annular ring 16 by fastening means 29, 30 and 31, respectively. The first ends 13A through 15A of oscillation selection brushes 13 through 15 respectively, slidably engage the outer periphery of oscillation control cam 25 while the opposite ends 13B through 15B of oscillation signal inpush brushes 13 through 15 slidably engage associating conductive segments 17, 18 and 19 respectively. A common brush 21 is also mounted to annular means 16 by fastening means 32 in such a manner that the end 21A engages slip ring 12 and the opposite end 21B slidably engages conductive segment 20 for a purpose to be more fully described.

The operation of the recording instrument is as follows:
When the motor (not shown) which drives the paper tape 24 and recording pen 11 becomes energized, recording pen 11 and oscillation signal selection cam 25 are driven to rotation in either the clockwise or counter-clockwise directions as shown by arrow 28, depending only upon the output of the motor driving means. As the oscillation control cam 25 is rotated in the clockwise direction, for example, from the position shown in FIG. 1, its conductive segment 22 will align itself angularly so as to make contact with the end 13A of oscillation control brush 13. At this instant a conductive path extends from terminal 17A of conductive segment 17 through oscillation control brush 13, conductive segment 22, slip ring 12, common brush 21 and conductive segment 20 to an output utilization means (not shown) having the facility to recognize the oscillation frequency impressed upon terminal 17A. Each of the terminal points 17a through 20a are connectable to signal generating sources (not shown); each of said sources being designed to operate at a different frequency. Further clockwise rotation of oscillation control cam 25 subsequently places conductive segment 22 in electrical contact with oscillation control brush 14, thus changing the oscillation frequency at terminal 20A of conductive segment 20 which is slidably engaged by common brush 21.

In order to alter the relative positions between conductive segment 22 and oscillation signal input brushes 13 through 15, annular member 16 may be rotated in either the clockwise or counter-clockwise direction as shown by arrow 26 so that the oscillation point may be modified depending upon the recording ranges of the information to be recorded by recording instrument 10. It should be noted that the downward forces exerted by the curved ends 13B through 15B and 21B of control brushes 13 through 15 and 21, respectively, urge annular member 16 upwardly with respect to base member 23 causing engagement between cooperating ledges 6A and 23A wherein the forces exerted by brushes 13 through 15 and 21 and the cooperating ledges 16A and 23A cooperate to retain annular member 16 in its proper position. The arcuate portions of conductive segments 17, 18 and 19 and 20 are so designed as to provide continuous electrical engagement with the turned-in ends 13B through 15B and 21B even though annular member 16 be rotated in the clockwise or the counter-clockwise direction, thereby providing relatively simple adjustment of the recording ranges without the necessity for a changeover switch to connect the proper oscillation frequency signal thereto. The oscillation signal input brushes 13 through 15 are sufficiently resilient so that any rotation of the recording pen 11 by the driving means permits bending of these elements while at the same time having their ends such as the end 13a thereof remaining in continuous engagement with the conductive segment 22 once the selection 1 of said input means 13 through 15 is made. Also the slidable portions of these members which slidably engage the conductive surfaces 17, 18 and 19 permit movement of the signal input members 13 through 15 in order to retain the extreme ends thereof in engagement with the conductive segment 22. Also the portion 21b of arm 21 slidably engages conductive surface 20 to permit rotational movement of the recording pen 11 while at the same time maintaining a continuous conductive path between terminal 20a and one of the three frequency input terminals 17a through 19a.

The features and principles underlying the invention described above in connection with specific exemplifications thereof will suggest to those skilled in the art many other modifications thereof. It is accordingly desired that the appended claims shall not be limited to any specific features or details described in connection with the exemplifications thereof.

It is claimed:

1. Oscillation control means for use in recording instruments comprising a shaft for connection with a suitable driving means, a recording stylus secured to said shaft means for generating a plot on a moving medium in response to rotation of said driving means, cam means secured to said shaft and rotatable therewith, a plurality of oscillation signal input means slidably engaged by said cam means for selecting an oscillation frequency signal related to the angular position of said rotatable cam means, oscillation signal selection means including an adjustable means for modifying the relative angular positions of said oscillation signal selection means with respect to said cam means for adjusting the recording range of the data to be recorded, oscillation signal input brushes secured to said adjustable means each being connectable to an associated oscillation source and rotatable with said adjustable means for enabling the said generation of said plot.

2. Oscillation control means for use in recording instruments comprising a shaft for connection with a suitable driving means, a recording stylus secured to said shaft means for generating a plot on a moving medium in response to rotation of said driving means, cam means secured to said shaft and rotatable therewith, a plurality of oscillation signal input means slidably engaged by said cam means for selecting an oscillation frequency signal related to the angular position of said rotatable cam means, oscillation signal selection means including and adjustable means for modifying the relative angular positions of said oscillation signal selection means with respect to said cam means for adjusting the recording range of the data to be recorded, oscillation signal input brushes secured to said adjustable means each being connectable to an associated oscillation source and rotatable with said adjustable means for enabling the said generation of said plot, common brush means secured to said adjustable means and slidably engaged by said cam means for receiving the output of one of said oscillation sources.

3. Oscillation control means for use in recording instruments comprising a shaft for connection with a suitable driving means, a recording stylus secured to said shaft means for generating a plot on a moving medium in response to rotation of said driving means, cam means secured to said shaft and rotatable therewith, a plurality of oscillation signal input means slidably engaged by said cam means for selecting an oscillation frequency signal related to the angular position of said rotatable cam means, oscillation signal selection means including an adjustable means for modifying the relative angular positions of said oscillation signal input means with respect to said cam means for adjusting the recording range of the data to be recorded, oscillation signal input brushes secured to said adjustable means each being connectable to an associated oscillation source and rotatable with said adjustable means for enabling the said generation of said plot, common brush means secured to said adjustable means and slidably engaged by said cam means for receiving the output of one of said oscillation sources, said cam means comprising a circular shaped insulating member, a conductive segment positioned along the periphery of said insulating member for slidable engagement with said oscillation signal input brushes.

4. Oscillation control means for use in recording instruments comprising a shaft for connection with a suitable driving means, a recording stylus secured to said shaft means for generating a plot on a moving medium in response to rotation of said driving means, cam means secured to said shaft and rotatable therewith, a plurality of oscillation signal input means slidably engaged by said cam means for selecting an oscillation frequency signal related to the angular position of said rotatable cam means, oscillation signal selection means including an adjustable means for modifying the relative angular positions of said oscillation signal input means with respect to said cam means for adjusting the recording range of the data to be recorded, oscillation signal input brushes secured to said adjustable means each being connectable to an associated oscillation source and rotatable with said adjustable means for enabling the said generation of said plot, common brush means secured to said adjustable means and slidably engaged by said cam means for receiving the output of one of said oscillation sources, said cam means comprising a circular shaped insulating member, a conductive segment positioned along the periphery of said insulating member for slidable engagement with said oscillation signal input brushes, a slip ring electrically connected to said conductive segment and positioned to make a continuous slidable engagement with said common brush means.

5. Oscillation control means for use in recording instruments comprising a shaft for connection with a suitable driving means, a recording stylus secured to said shaft means for generating a plot on a moving medium in response to rotation of said driving means, cam means secured to said shaft and rotatable therewith a plurality of oscillation signal input means slidably engaged by said cam means for selecting an oscillation frequency signal related to the angular position of said rotatable cam means, oscillation signal selection means including an adjustable means for modifying the relative angular positions of said oscillation signal input means with respect to said cam means for adjusting the recording range of the data to be recorded, oscillation signal input brushes secured to said adjustable means each being connectable to an associated oscillation source and rotatable with said adjustable means for enabling the said generation of said plot, common brush means secured to said adjustable means and slidably engaged by said cam means for receiving the output of one of said oscillation sources, said cam means comprising a circular shaped insulating member, a conductive segment positioned along the periphery of said insulating member for slidable engagement with said oscillation signal input brushes, a slip ring electrically connected to said conductive segment and positioned to make a continuous slidable engagement with said common brush means, said oscillation control brushes and said common brush means each including conductive segments slidably engageable with said oscillation control brushes to maintain electrical contact between said control and common brushes and their associated input and output connections, respectively.

6. Oscillation control means for use in recording instruments comprising a rotatable shaft for connection with a suitable driving means, a cylindrically shaped cam and a recording stylus secured to said shaft, said stylus being adapted to produce a data recording in response to rotation of said shaft, an insulated base member having a slot positioned adjacent said control cam, an annular insulating member positioned in said slot, a plurality of oscillating signal input brushes secured to said insulating member, the first ends of each of said control brushes being slidably engaged by said cam, a plurality of arcuate shaped conductive segments positioned on said base member each of said segments being slidably engaged by the opposite end of an associated control brush, said annular member being adapted to rotate within said slot.

7. Oscillation control means for use in recording instruments comprising a rotatable shaft for connection with a suitable driving means, a cylindrically shaped cam and a recording stylus secured to said shaft, said stylus being adapted to produce a data recording in response to rotation of said shaft, an insulated base member having a slot positioned adjacent said control cam, an annular insulating member positioned in said slot, a plurality of oscillating signal input brushes secured to said insulating member, the first ends of each of said control brushes being slidably engaged by said cam, a plurality of arcuate shaped conductive segments positioned on said base member each of said segments being slidably engaged by the opposite end of an associated control brush, said annular member being adapted to rotate within said slot, said cam being formed of an insulating material, a conductive segment positioned along the periphery of said cam.

8. Oscillation control means for use in recording instruments comprising a rotatable shaft for connection with a suitable driving means, a cylindrically shaped cam and a recording stylus secured to said shaft, said stylus being adapted to produce a data recording in response to rotation of said shaft, an insulated base member having a slot positioned adjacent said control cam, an annular insulating member positioned in said slot, a plurality of oscillating signal input brushes secured to said insulating member, the first ends of each of said control brushes being slidably engaged by said cam, a plurality of arcuate shaped conductive segments positioned on said base member each of said segments being slidably engaged by the opposite end of an associated control brush, said annular member being adapted to rotate within said slot, said cam being formed of an insulating material, a conductive segment positioned along the periphery of said cam, a common brush secured to said annular member and having a first end and a second end, a slip ring electrically connected to said conductive segment and positioned to be slidably engaged by said common brush first end, a second arcuate segment positioned on said base member for slidable engagement with said common brush second end for electrically connecting said common brush to an output utilization means.

9. Oscillation control means for use in recording instruments comprising a rotatable shaft for connection with a suitable driving means, a cylindrically shaped cam and a recording stylus secured to said shaft, said stylus being adapted to produce a data recording in response to rotation of said shaft, an insulated base member having a slot positioned adjacent said control cam, an annular insulating member positioned in said slot, a plurality of oscillating signal input brushes secured to said insulating member, the first ends of each of said control brushes being slidably engaged by said cam, a plurality of arcuate shaped conductive segments positioned on said base member each of said segments being slidably engaged by the opposite end of an associated control brush, said annular member being adapted to rotate within said slot, said cam being formed of an insulating material, a conductive segment positioned along the periphery of said cam, a common brush secured to said annular member and having a first end and a second end, a slip ring electrically connected to said conductive segment and positioned to be slidably engaged by said common brush first end, a second arcuate segment positioned on said base member for slidable engagement with said common brush second end for electrically connecting said common brush to an output utilization means, brushes being formed of a resilient conductive material and being adapted to urge said annular member into slidable engagement with said base member.

10. Oscillation control means for use in recording instruments of the depth detection type comprising rotatable shaft means; a recording stylus secured to said shaft means and rotatable therewith for generating a plot on a moving medium; cam means secured to said shaft means and being rotatable therewith; a plurality of oscillation signal input means slidably engaging said cam means and being sequentially selected by said cam means upon rotation thereof; adjustable means for modifying the relative angular positions of said oscillation signal input means relative to said cam means for adjusting the recording range of the recording instrument.

References Cited by the Examiner
UNITED STATES PATENTS

| 2,433,332 | 12/47 | Benioff | 177—386 |
| 2,869,109 | 1/59 | Fryklund | 340—3 |
| 2,906,838 | 9/59 | Deighton | 200—11 |
| 3,031,251 | 4/62 | Holliday et al. | 346—139 |

LEO SMILOW, *Primary Examiner.*

EMIL G. ANDERSON, *Examiner.*